US009751402B2

(12) United States Patent
Fama et al.

(10) Patent No.: US 9,751,402 B2
(45) Date of Patent: Sep. 5, 2017

(54) SYSTEM, METHOD AND APPARATUS FOR INSTALLING A TORQUE TUBE (71) Applicant: GENERAL ELECTRIC COMPANY, Schenectady, NY (US)

(72) Inventors: Anthony Paul Fama, Harborcreek, PA (US); Bernd Daeschner, Fariview, PA (US)

(73) Assignee: General Electric Company, Schenectady, NY (US)

( * ) Notice: Subject to any disclaimer, the term of this patent is extended or adjusted under 35 U.S.C. 154(b) by 198 days.

(21) Appl. No.: 14/589,234

(22) Filed: Jan. 5, 2015

(65) Prior Publication Data

US 2016/0193914 A1 Jul. 7, 2016

(51) Int. Cl.
*B60K 17/04* (2006.01)
*B60B 27/00* (2006.01)

(52) U.S. Cl.
CPC ........ *B60K 17/043* (2013.01); *B60B 27/0021* (2013.01); *B60K 17/046* (2013.01); *B60B 2320/10* (2013.01); *B60Y 2200/142* (2013.01); *B60Y 2200/145* (2013.01)

(58) Field of Classification Search
CPC  B60K 17/043; B60K 17/046; B60B 27/0021; B60B 2320/10; B60B 35/12; B60B 35/125; B60Y 2200/142; B60Y 2200/145
USPC ...... 301/126, 137, 105.1, 35.628, 10.1, 11.1, 301/13.2, 36.1; 74/607; 29/893.2, 29/894.361; 180/65.51, 363, 372, 374, 180/380, 383, 385
See application file for complete search history.

(56) References Cited

U.S. PATENT DOCUMENTS

| | | | | |
|---|---|---|---|---|
| 1,611,710 A | * | 12/1926 | Ayers | B60C 23/12 152/420 |
| 2,635,913 A | * | 4/1953 | Fitzgerald | A61G 1/04 294/67.1 |
| 4,651,792 A | * | 3/1987 | Taylor | B60C 23/12 141/198 |
| 6,062,763 A | * | 5/2000 | Sirois | B62D 27/04 248/635 |
| 6,538,237 B1 | * | 3/2003 | Yang | C30B 25/08 118/724 |
| 8,714,661 B2 | | 5/2014 | Vallejo | |
| 8,763,495 B2 | | 7/2014 | Witcher et al. | |
| 2006/0157235 A1 | * | 7/2006 | Allensworth | E21B 17/1035 166/75.13 |
| 2010/0101948 A1 | * | 4/2010 | Lippert | C23C 14/3407 204/298.28 |

(Continued)

*Primary Examiner* — S. Joseph Morano
*Assistant Examiner* — Jean Charleston
(74) *Attorney, Agent, or Firm* — Global Patent Operation; John A. Kramer (57) ABSTRACT An apparatus for installing a torque tube includes a first clamp portion and a second clamp portion. The first clamp portion is arcuate in shape and has opposed first distal ends. The second clamp portion is arcuate in shape and has opposed second distal ends configured to abut the first distal ends of the first clamp portion to form a ring. The first clamp portion and the second clamp portion are configured to clamp a torque tube therebetween. The apparatus also includes a plurality of legs depending downwardly from the first clamp portion and the second clamp portion which are configured to set a spacing between the torque tube and a seal ring.

20 Claims, 9 Drawing Sheets (56) References Cited

U.S. PATENT DOCUMENTS

2012/0066884 A1\* 3/2012 Daeschner .............. B23P 19/00
   29/447
2012/0205966 A1\* 8/2012 Witcher ................ B60B 35/125
   301/126

\* cited by examiner

SYSTEM, METHOD AND APPARATUS FOR INSTALLING A TORQUE TUBE

FIELD OF THE INVENTION

Embodiments of the invention relate to wheel drive assemblies, and, more particularly, to a system, method and apparatus for installing a torque tube of a wheel drive assembly.

BACKGROUND OF THE INVENTION

Off-highway vehicles ("OHVs"), such as mining vehicles used to haul heavy payloads, typically employ motorized wheels for propelling or retarding the vehicle in an energy efficient manner. This efficiency is typically accomplished by employing a large horsepower diesel engine in conjunction with an alternator, a main traction inverter, and a pair of wheel drive assemblies housed within the rear tires of the vehicle. The diesel engine drives the alternator and the alternator, in turn, powers the main traction inverter thereby supplying electrical power having a controlled voltage and frequency to electric drive motors of the wheel drive assemblies. Each wheel drive assembly houses a planetary gear transmission that converts the rotation of the associated drive motor energy into a high torque, low speed rotational energy output which is supplied to the wheels.

Planetary gear transmissions are generally operated in a wet lubricated condition. As will be appreciated, it is generally desirable to minimize or prevent leakage of lubricants, e.g., oil, from wheel drive assemblies as such leakage leads to vehicle downtime for disassembly, inspection and repair.

In particular, OHV wheel assemblies typically include torque tubes to facilitate torque transfer to the wheels of the OHV. Torque tubes are generally secured to a body portion of an oil seal that forms an interface between the torque tube and a wheel frame of the wheel assembly. As will be readily appreciated, torque tubes are extremely heavy and are typically joined to the wheel frame by lowering the torque tube onto the wheel frame from above. During this process, special care must be taken to prevent the weight of the torque tube from crushing the seal between the seal ring and the torque tube and to set the proper clearance between the torque tube and the seal ring housing the oil seal.

In view of the above, it is desirable to provide an apparatus for installing a torque tube that facilitates the proper spacing between the torque tube and the seal ring and minimizes the risk of crushing the seal between the seal ring and torque tube.

BRIEF DESCRIPTION OF THE INVENTION

In an embodiment, an apparatus for installing a torque tube is provided. The apparatus includes a first clamp portion and a second clamp portion. The first clamp portion is arcuate in shape and has opposed first distal ends. The second clamp portion is arcuate in shape and has opposed second distal ends configured to abut the first distal ends of the first clamp portion to form a ring. The first clamp portion and the second clamp portion are configured to clamp a torque tube therebetween. The apparatus also includes a plurality of legs depending downwardly from the first clamp portion and the second clamp portion which are configured to set a spacing between the torque tube and a seal ring.

In another embodiment, a method for installing a torque tube is provided. The method includes the steps of arranging a first clamp portion about the torque tube such that at least one first tab of the first clamp portion contacts a shoulder of the torque tube to position the first clamp portion at a predetermined axial location along the torque tube, arranging a second clamp portion about the torque tube opposite the first clamp portion such that at least one second tab of the second clamp portion contacts the shoulder of the torque tube to position the second clamp portion at the predetermined axial location along the torque tube, clamping the first clamp portion to the second clamp portion to exert a force on the outer peripheral surface of the torque tube sufficient to bear a weight of the torque tube, and lowering the torque tube via the first clamp portion and second clamp portion onto a wheel frame until downwardly depending legs of the first portion and the second portion contact the wheel frame to prevent further axial movement of the torque tube with respect to the wheel frame.

In yet another embodiment, a system is provided. The system includes a torque tube having a ring gear and a barrel portion extending from the ring gear and defining a shoulder portion therebetween, a wheel frame having a seal ring coupled to the torque tube and providing a seal between the seal ring and the torque tube, and a spacing device coupled to the torque tube at a predetermined axial location along the torque tube. The spacing device includes a plurality of depending legs that are configured to contact the wheel frame to set a predetermined clearance between the torque tube and the seal ring.

BRIEF DESCRIPTION OF THE DRAWINGS

The present invention will be better understood from reading the following description of non-limiting embodiments, with reference to the attached drawings, wherein below.

DETAILED DESCRIPTION OF THE INVENTION

Reference will be made below in detail to exemplary embodiments of the invention, examples of which are illustrated in the accompanying drawings. Wherever possible, the same reference numerals used throughout the drawings refer to the same or like parts.

An embodiment of the inventive apparatus 100 is configured to facilitate the installation of a torque tube 20 of an OHV 10 as depicted in FIGS. 1-5. As shown, the OHV 10 is supported on paired dual rear drive tire assemblies 12 and on single front steering tire assemblies 14. Each dual rear drive tire assembly 12 is mounted on a wheel drive assembly 16, which includes a wheel frame 18 as well as the torque tube 20 and a wheel hub 22 supported on the wheel frame and fastened to the torque tube 20. The tire assemblies 12 can be bolted to the wheel hub 22 as further discussed below. The wheel frame 18 also supports a brake assembly 24, which is disposed adjacent to an outboard end of the wheel hub 22 but is not fastened to the wheel hub.

Each wheel assembly 16 can be bolted to the vehicle 10 by way of a mounting flange 26 provided on the wheel frame 18. The wheel frame 18 is radially tapered from the mounting flange 26, through a generally conical or hyperbolic transition portion 28, to a main cylindrical or substantially cylindrical tube portion shown in FIG. 5, discussed below. The torque tube 20 is disposed around the radially outward facing surface of the tube portion of the wheel frame 18. On the transition portion 28 of the wheel frame 18, an oil seal ring 30 is fixed to the wheel frame 18.

As is known in the art, the torque tube 20 may include a ring gear 34 adjacent to the oil seal ring 30, and may also include a barrel portion 36 that extends from the ring gear 34 along the wheel frame to a hub flange 38. On the end of the ring gear 34 adjacent to the oil seal ring 30, a complementary seal body 32 is fastened to the torque tube 20. As will be readily appreciated, the seal body 32 forms a labyrinth sealing arrangement with the oil seal ring 30 in a manner heretofore known in the art. In particular, the seal body 32 may include a plurality of fingers that are configured to nestably engage with corresponding fingers of the oil seal ring 30. In other embodiments, the ring gear may include a plurality of integral fingers that are configured to engage corresponding fingers of the oil seal ring 30 to form a labyrinth seal.

Figure 1:
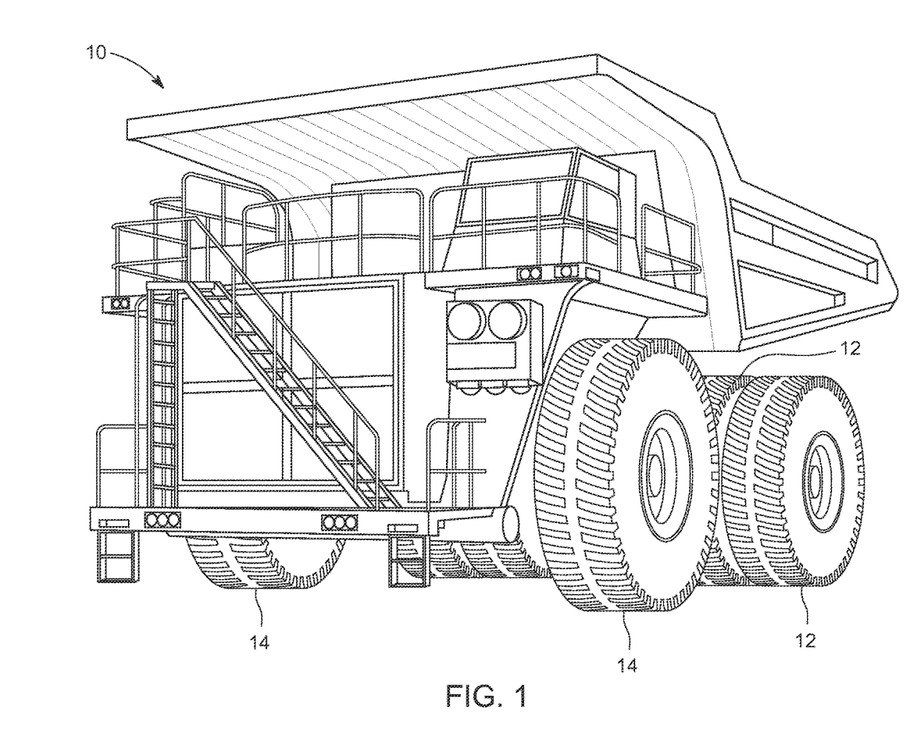
FIG. 1 shows a perspective view of an OHV.
Figure 2:
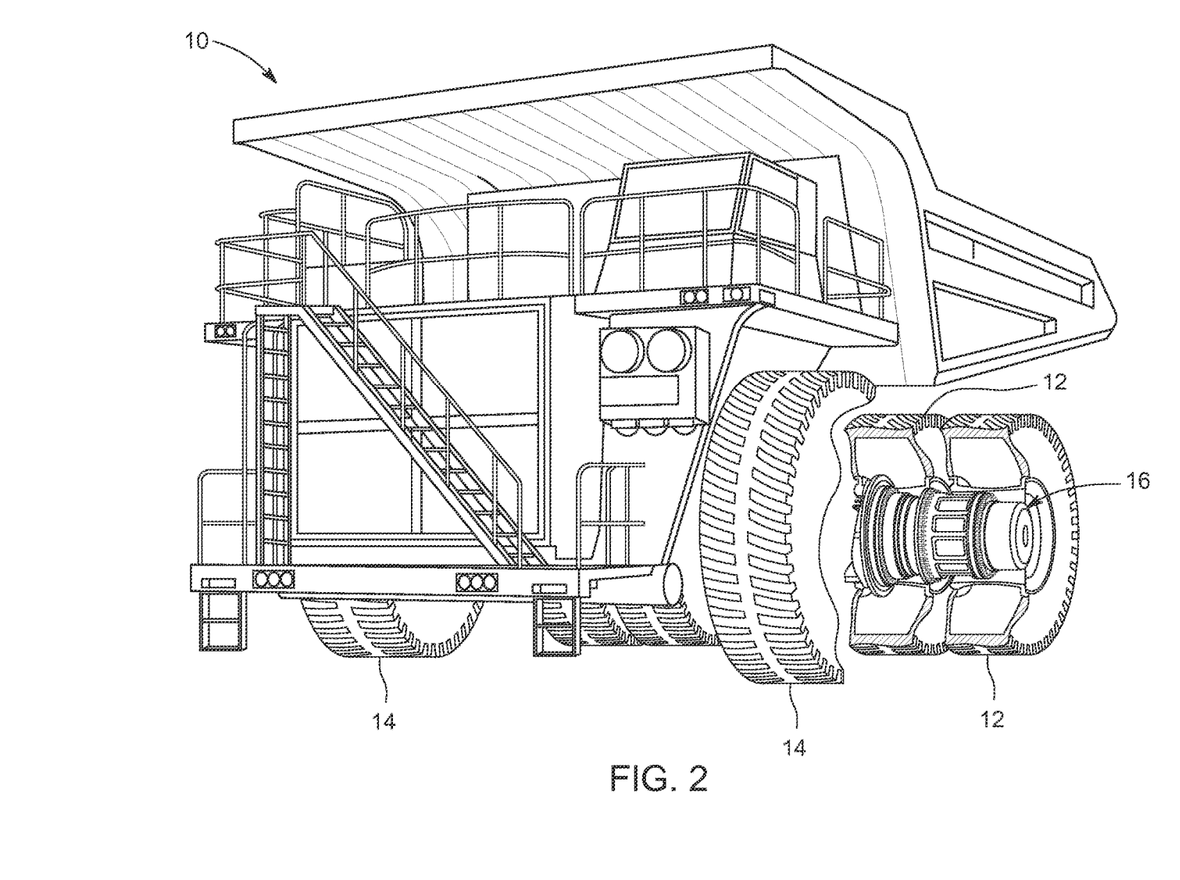
FIG. 2 shows a partial perspective cutaway view showing a wheel drive assembly of the OHV shown in FIG. 1.
Figure 3:
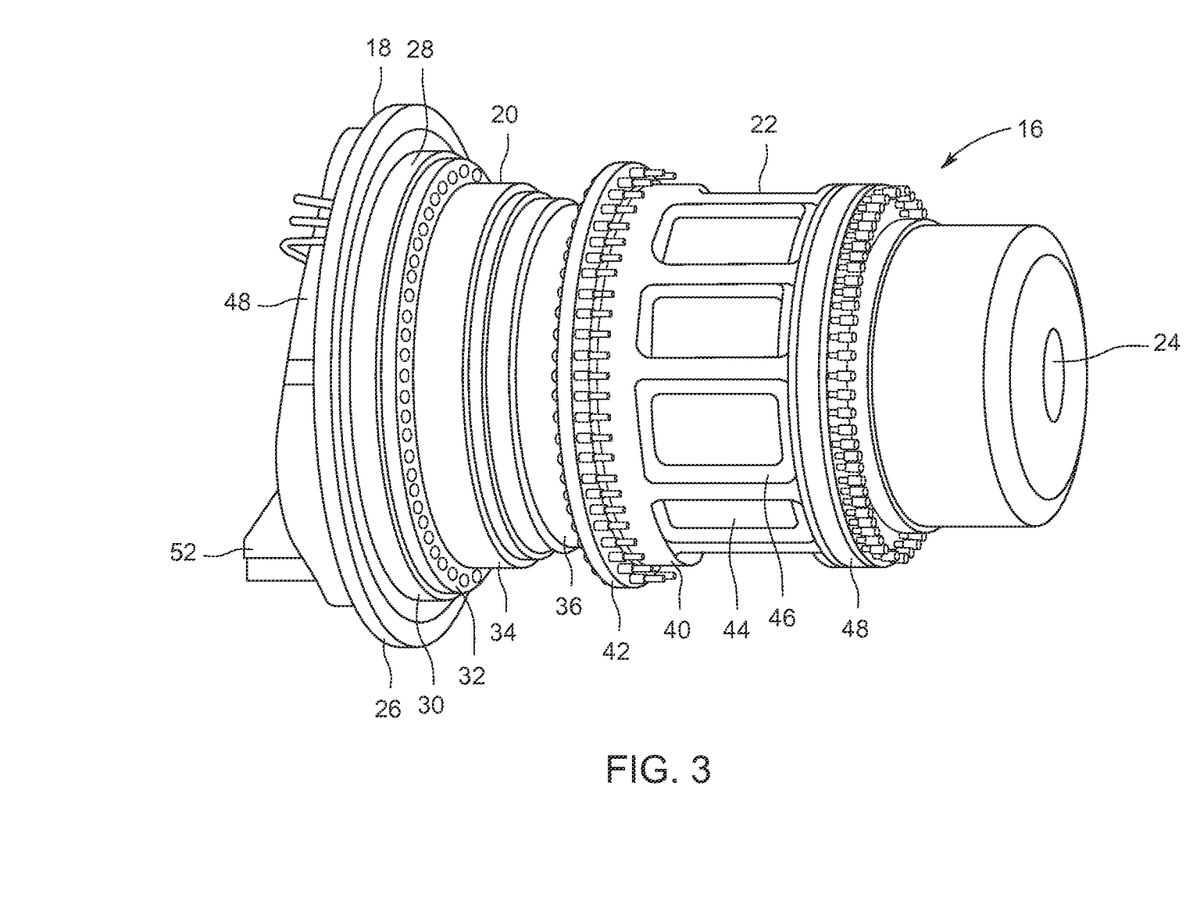
FIGS. 3 and 4 show partial side and end perspective views of the wheel drive assembly shown in FIG. 2 incorporating a torque tube in accordance with an embodiment of the present invention.
Figure 4:
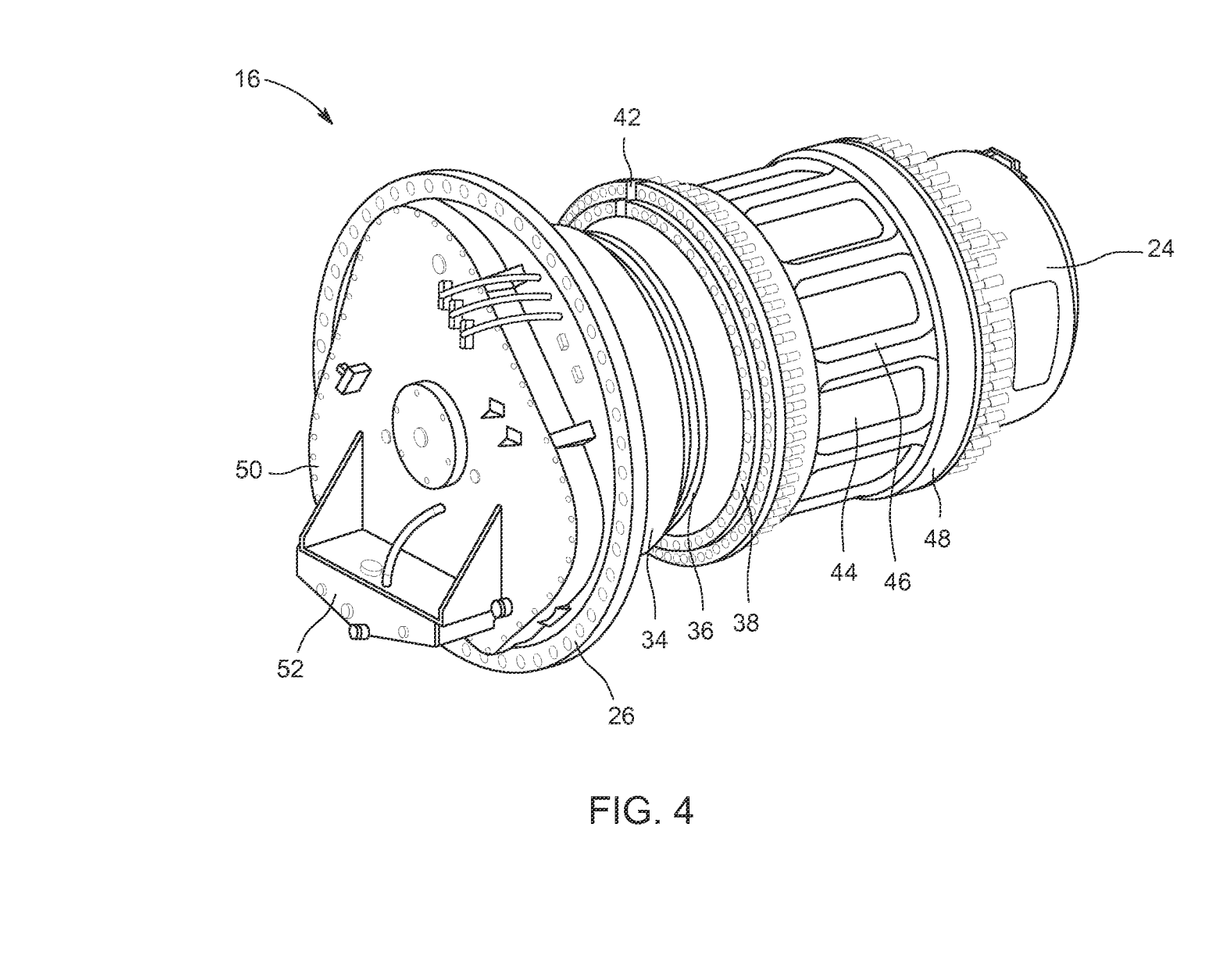
Figure 5:
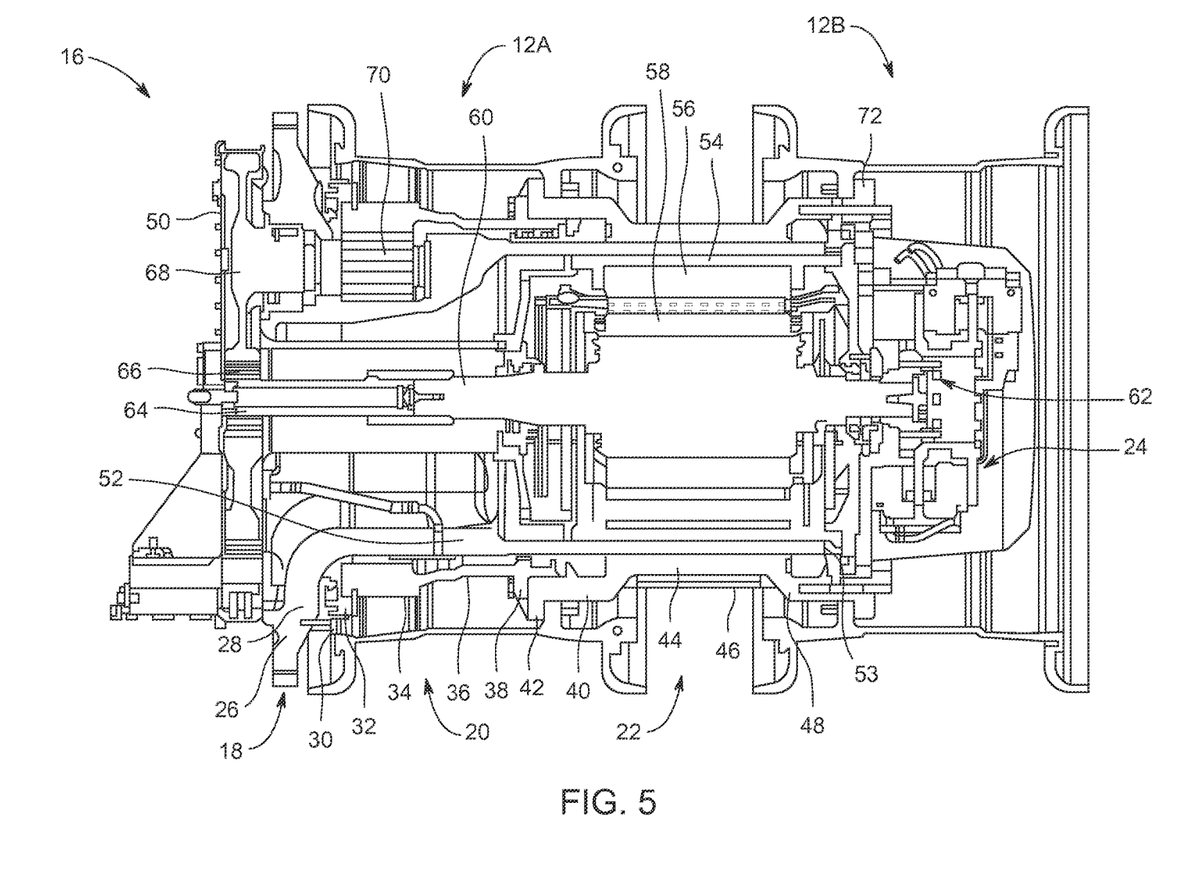
FIG. 5 shows a side sectional view of the wheel drive assembly shown in FIGS. 3 and 4.

FIG. 5 is a side sectional view illustrating multiple components of the wheel assembly 16 and their relationship to an embodiment of the inventive wheel hub 22 and wheel frame 18. As shown, at the inboard and outboard ends 40, 48 of the wheel hub 22, inboard and outboard bearings 51a, 51b, respectively, are provided to support the wheel hub on a wheel frame barrel 52. The wheel frame barrel 52 extends from the transition portion 28 to an annular hub end surface 53, to which the brake assembly 24 is mounted. Adjacent the hub end surface 53, an electric motor 54 is housed inside the wheel frame 18. The electric motor 54 includes a stator 56 and a rotor 58, from which a shaft 60 protrudes toward a first end proximate to the mounting flange 26 of the wheel frame 18, and toward a second end within the brake assembly 24. Within the brake assembly 24, a brake rotor 62 is mounted onto the second end of the shaft 60. Within the wheel frame 18, a sun gear shaft 64 is splined to the first end of the shaft 60. The sun gear shaft 64 supports a sun gear 66 housed centrally within the gear cover 50. The sun gear 66 is meshed with a plurality of planet gears 68 carried on common axles with pinion gears 70, which mesh with internal teeth of the torque tube ring gear 34. In some embodiments, there are three planet gears 68 and three pinion gears 70. The torque tube 20 is supported between the pinion gears and the wheel hub 22.

Referring to the wheel hub 22, an inboard tire assembly 12a (partially shown) is bolted to the rim flange 42. At the outboard end 48 of the wheel hub 22, a hub adapter 72 is bolted to the wheel hub 22 and an outboard tire assembly 12b (partially shown) is bolted to the hub adapter 72.

Figure 6:
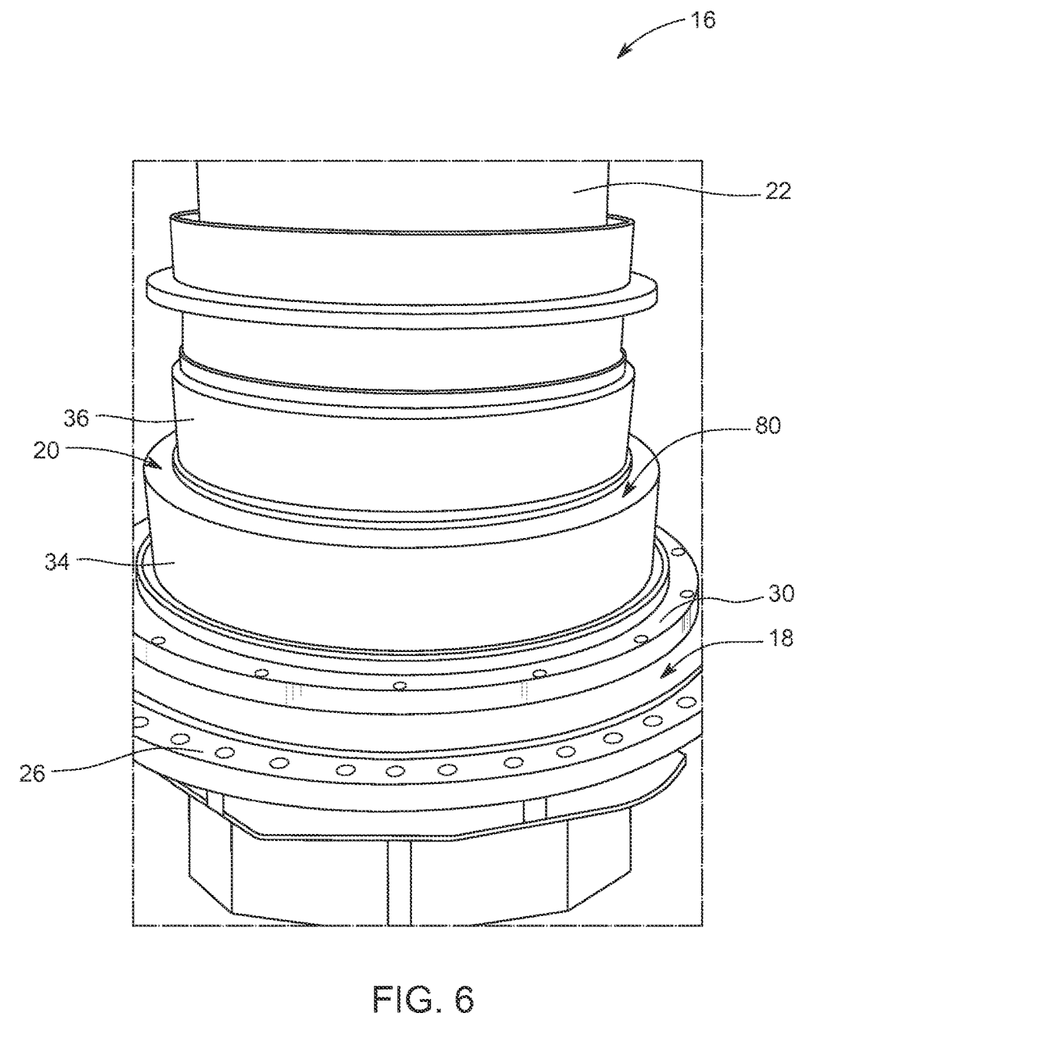
FIG. 6 shows a perspective view of an apparatus for installing a torque tube in accordance with an embodiment of the present invention.

With reference to FIG. 6, an enlarged, detail view of the wheel assembly 16 is illustrated. During assembly, the wheel frame 18 of the wheel assembly 16 is positioned in a fixture and the torque tube 20 is lowered onto the wheel frame 18 from above. As will be readily appreciated, however, the torque tube 20 is extremely heavy and proper alignment and spacing between the torque tube and seal ring 30 during lowering of the torque tube 20 is necessary to prevent the weight of the torque tube 20 from crushing or deforming the fingers of the labyrinth seal formed by seal ring 30 and the torque tube 20.

Figure 7:
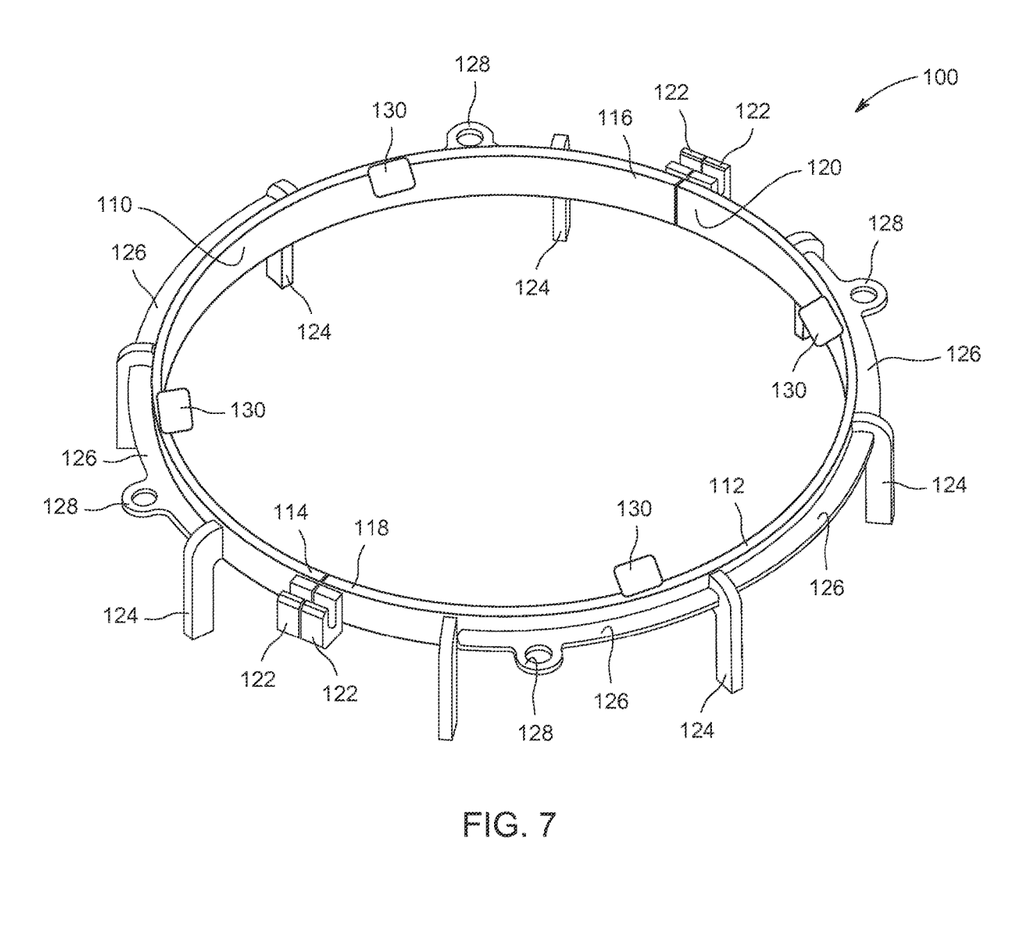
FIG. 7 shows a detail, perspective view of a wheel drive assembly including torque tube, assembled utilizing the apparatus of FIG. 6.

In view of the above, and with reference to FIG. 7, the present invention provides an apparatus 100 that facilitates the assembly of the torque tube 20 with the wheel frame 18. As illustrated therein, the apparatus 100 includes a pair of opposed, semi-circular shaped (arcuate) clamp portions, including first clamp portion 110 and second clamp portion 112. Each of the clamp portions 110, 112 has opposed distal ends 114, 116 and 118, 120, respectively. Each clamp portion 110, 112 also includes two respective clamping blocks 122 coupled to the outer peripheral surface of the clamp portions 110, 112 adjacent to the distal ends 114, 116, 118, 120. Each clamping block 112 has a generally U-shaped channel formed therein which accommodates a bolt or other fastening member, as discussed in detail below. In an embodiment, the U-shaped channel may be a throughbore sized to accommodate the passage of a bolt therethrough. The inside diameter of each clamp portion 110, 112 is sized to accommodate the outer peripheral surface of the ring gear portion 34 of the torque tube 20, as discussed hereinafter. In particular, the inside diameter of each clamp portion 110, 112 is substantially equal to the outside diameter of the outer surface of the ring gear 34.

With further reference to FIG. 7, the clamp portions 110, 112 each include a plurality of legs 124 coupled to the outer peripheral surface thereof that depend downwardly from the clamp portions. The legs 124 each extend downwardly to an extent sufficient to establish a predetermined clearance between the torque tube 20 and the seal ring 30, as discussed hereinafter. In an embodiment, the legs 124 are generally L-shaped and have a first end attached to the outer peripheral surface of one of the clamp portions 110, 112 and a second end that is configured to rest on the a radial surface of the wheel frame 18. Each clamp portion 110, 112 also includes a plurality of arcuate ribs 126 extending substantially perpendicular from the outer peripheral surface of the clamp portions 110, 112 and extending between the legs 124. Each of the ribs 126 includes at least one respective lifting aperture 128 that is utilized to selectively lift the torque tube 20 into position in the manner described hereinafter.

Each clamp portion 110, 112 further includes at least one tab 130 attached to or integrally formed with the clamp portions 110, 112 and which extend inward therefrom. In an embodiment, the tabs 130 are substantially planar pieces of metal stock that are welded or otherwise fixedly secured to the upper surface of the clamp portions 110, 112 at spaced radial locations. In an embodiment, each clamp portion 110, 112 includes a respective pair of tabs 130.

In an embodiment, the clamping blocks 122, legs 124, ribs 126, and tabs 130 may each be welded to the main arcuate bodies of the clamp portions 110, 112, although other means of attachment and/or fastening means known in the art, such as bolts, screws and the like, may also be utilized without departing from the broader aspects of the present invention. In other embodiments, one or more of these components may be integrally formed with the clamp portions 110, 112.

With further reference to FIGS. 6, 7, 8A, and 8B, during assembly, the wheel frame 18 containing the seal ring 30 is first positioned in a fixture 132. The torque tube assembly facilitation apparatus 100 is then clamped to the torque tube 20 in the manner hereinafter described. In particular, one of the clamp portions, such as first clamp portion 110, is lowered onto the torque tube 20 until the tabs 130 are resting on the shoulder 80 of the torque tube 20 intermediate the ring gear 34 and the barrel portion 36 and the inner periphery of the clamp portion 110 receives the outer, lateral surface of the ring gear 34. The second clamp portion 112 may then be lowered onto the torque tube in a similar manner such that tabs 130 of the second clamp portion 112 also rest atop shoulder 80 and the inner periphery of the clamp portion 112 receives the outer surface of the ring gear 34. In this position, the distal ends 114, 116 of the first clamp portion 110 abut the distal ends 118, 120 of the second clamp portion 112. As used herein, "abut" means that two components are in close association with one another but not necessarily in direct, touching contact with one another (e.g., there may exist a space between the two components). As will be readily appreciated, the tabs 130 are utilized to ensure that the apparatus 100 is flush against the shoulder 80 of the torque tube 20.

Figure 8A:
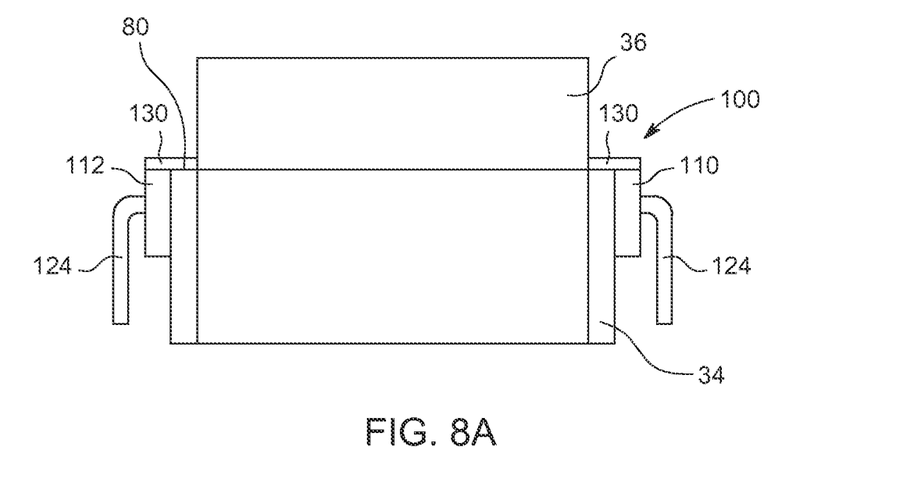
FIGS. 8A and 8B show cross-sectional views of the apparatus and torque tube, illustrating an installation process according to an embodiment of the present invention.
Figure 8B:
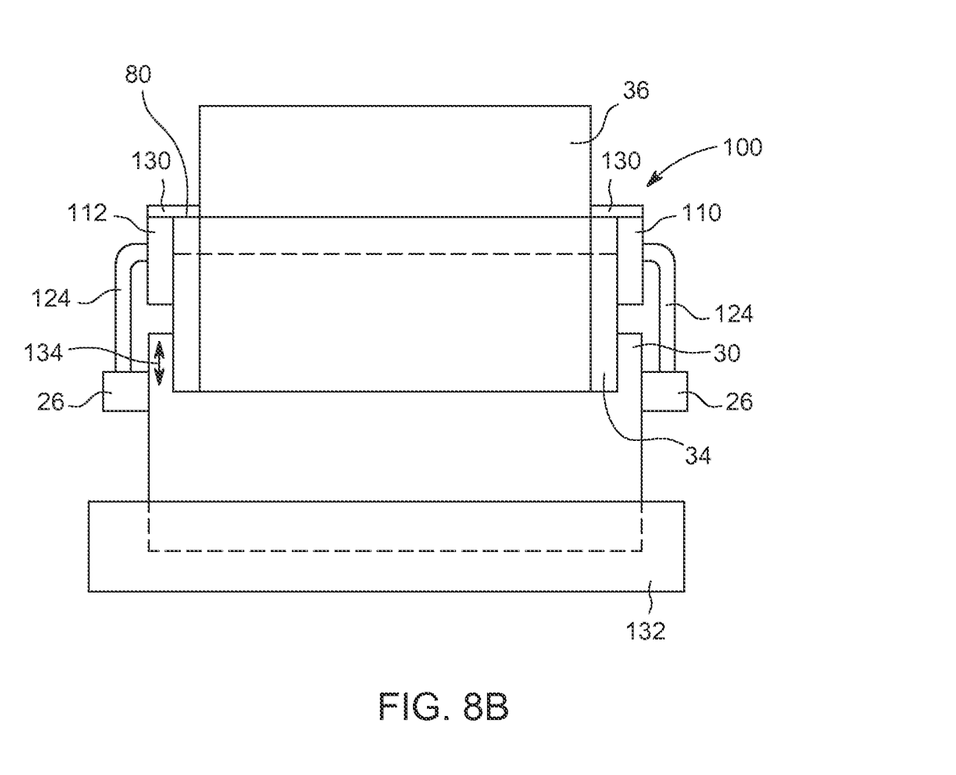

The first and second clamp portions 110, 112 are then clamped together via the clamp blocks 122. In particular, in an embodiment, a bolt or similar fastening means may be inserted into the channel in the clamp blocks 122 and a corresponding nut is threaded onto the end of the bolt. The nut may then be tightened to draw the respective distal ends 114, 118 of the clamp portions 110, 112 together. Another bolt and nut may then be utilized to draw the respective distal ends 116, 120 of the clamp portions 110, 112 together. In an embodiment, a 1-inch diameter hex bolt may be utilized, although other fastening means may also be utilized without departing from the broader aspects of the present invention. Other possible fastening means include one or more hinged joints, latching mechanisms, etc. Once clamp portions 110, 112 are clamped with a radial clamping or friction force sufficient to bear the weight of the torque tube 20, lifting hooks may then be inserted into the lifting apertures 128 in the ribs 126. The torque tube 20 is then lifted off the ground via the lifting apertures 128 and lowered onto the wheel frame 18 from above.

As the torque tube 20 is lowered onto the wheel frame 18, the legs 124 of the apparatus 100 will contact the flange 26 of the wheel frame 18, thereby limiting the further downward travel of the torque tube 20. Therefore, the apparatus 100, and the legs 124 thereof, set the proper clearance between the torque tube 20 and the seal ring 30. In this manner, the apparatus 100 functions as a spacing device. In particular, as indicated above, the legs 124 are sized and dimensioned such that they set the proper spacing between the torque tube 20 and the seal ring 30, thereby preventing the labyrinth seal from being crushed between the seal ring 30 and the torque tube 20 during assembly. In an embodiment, the apparatus 100 and the legs 124 thereof are sized to set the spacing between the torque tube and seal ring between approximately 0.114 inches and approximately 0.167 inches. FIG. 8B best illustrates how the legs 124 contact the flange 26 of the wheel frame to set the spacing 134 between the torque tube 20 and seal ring 30. Once in the proper position, the torque tube 20 may be secured to the wheel frame 18 in the manner heretofore known in the art. In addition, the remainder of the wheel may then be assembled in a manner heretofore known in the art. The apparatus 100 may then be removed at any time during the remainder of the assembly process by simply removing the bolts and pulling the clamping portions 110, 112 apart.

Figure 9:
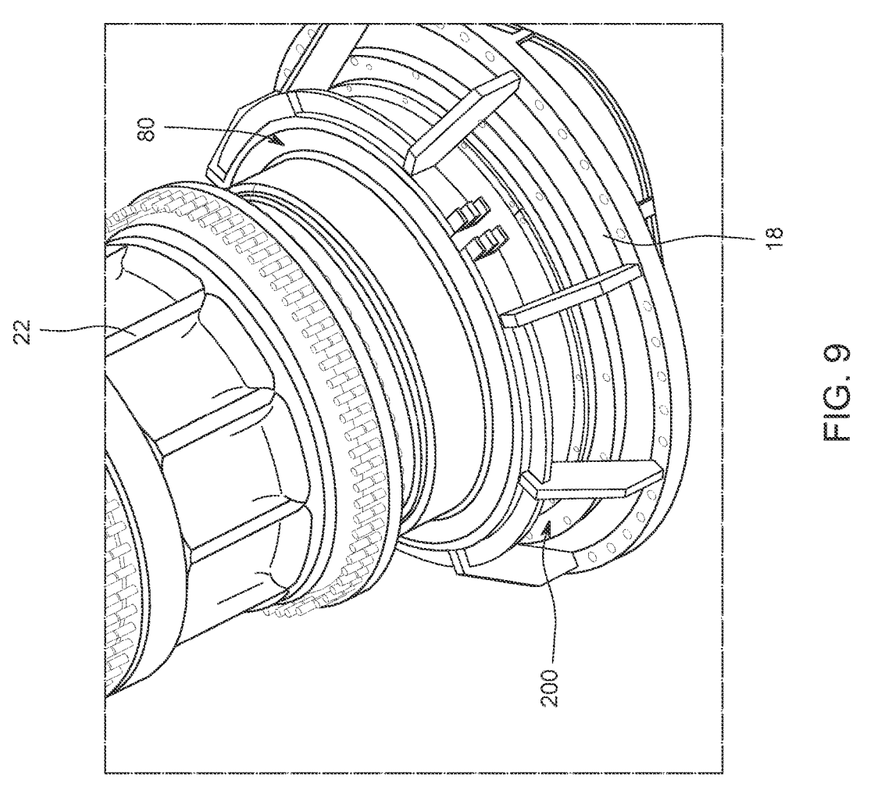
FIG. 9 shows a perspective view of a system for installing a torque tube including an apparatus for installing a torque tube in accordance with another embodiment of the present invention.

Referring now to FIG. 9, a torque tube assembly facilitation apparatus 200 according to another embodiment of the present invention is illustrated. As shown therein, the apparatus 200 is generally similar to the apparatus 100 of FIG. 7 and illustrates the manner in which the inventive apparatuses set the spacing between the torque tube and the seal ring (and seal housed therein), i.e., by limiting downwards travel of the torque tube 20 by having the legs contact the wheel frame. Indeed, FIG. 9 is included to generally show the manner in which the inventive apparatus is utilized to control and set the spacing between the torque tube and seal ring.

As will be readily appreciated, the apparatus 100 of the present invention may be modified to suit the particular application in which it will be used. In particular, the length of the legs may be modified to provide any desired spacing distance between the bottom of the legs and the underside surface of the tabs, which dictates the clearance afforded between the torque tube and seal ring. Moreover, the curvature or radius of the clamp portions may be adjusted or modified in dependence upon the particular size of the torque tube being installed. Accordingly, it is envisioned that the apparatus 100 of the present invention may be modified for use in a variety of wheel motor applications.

In an embodiment, an apparatus for installing a torque tube is provided. The apparatus includes a first clamp portion and a second clamp portion. The first clamp portion is arcuate in shape and has opposed first distal ends. The second clamp portion is arcuate in shape and has opposed second distal ends configured to abut the first distal ends of the first clamp portion to form a ring. The first clamp portion and the second clamp portion are configured to clamp a torque tube therebetween. The apparatus also includes a plurality of legs depending downwardly from the first clamp portion and the second clamp portion which are configured to set a spacing between the torque tube and a seal ring.

In an embodiment, the apparatus may also include plural tabs at least one or more of which are coupled to the first clamp portion and one or more others of which are coupled to the second clamp portion (i.e., one or more first tabs are coupled to the first clamp portion and one or more second tabs are coupled to the second clamp portion). The tabs extend inwardly toward a center of the ring and are configured to contact a shoulder of the torque tube to align the apparatus at a predetermined axial location on the torque tube.

In an embodiment, underside surfaces of the tabs are substantially planar with a top surface of the first and second clamp portions (when formed as the ring), and the underside surfaces of the tabs are configured to rest upon the shoulder of the torque tube.

In an embodiment, the legs are configured to contact a flange of a wheel frame containing the seal ring to arrest axial movement of the torque tube with respect to the wheel frame to set the spacing between the torque tube and the seal ring.

In an embodiment, the legs are substantially L-shaped.

In an embodiment, the apparatus may also include opposed first clamp blocks coupled to an outer peripheral surface of the first clamp portion adjacent to the first distal ends, respectively, and opposed second clamp blocks coupled to an outer peripheral surface of the second clamp portion adjacent to the second distal ends, respectively. The first and second clamp blocks may form opposed clamp block pairs. The apparatus further may include a fastening means associated with each clamp block pair for urging the opposed first distal ends of the first clamp portion and the opposed distal ends of the second clamp portion towards one another to decrease a diameter of the ring.

In an embodiment, the first clamp blocks and the second clamp blocks each have a generally U-shaped channel formed therein such that each opposed clamp block pair has a channel extending throughout a length thereof. The fastening means may include a bolt disposed in the channel and a nut threadedly engaged with the bolt.

In an embodiment, the apparatus may include at least one rib extending generally perpendicular from each of the first clamp portion and the second clamp portion. The rib includes a lifting aperture permitting the apparatus and the torque tube clamped therein to be lifted.

In an embodiment, the first clamp portion and the second clamp portion are configured to exert a clamping force on a peripheral surface of a ring gear of the torque tube sufficient to bear the weight of the torque tube.

In an embodiment, the shoulder is located intermediate the ring gear and a barrel portion of the torque tube.

In another embodiment, a method for installing a torque tube is provided. The method includes the steps of arranging a first clamp portion about the torque tube such that at least one first tab of the first clamp portion contacts a shoulder of the torque tube to position the first clamp portion at a predetermined axial location along the torque tube, arranging a second clamp portion about the torque tube opposite the first clamp portion such that at least one second tab of the second clamp portion contacts the shoulder of the torque tube to position the second clamp portion at the predetermined axial location along the torque tube, clamping the first clamp portion to the second clamp portion to exert a force on the outer peripheral surface of the torque tube sufficient to bear a weight of the torque tube, and lowering the torque tube via the first clamp portion and second clamp portion onto a wheel frame until downwardly depending legs of the first portion and the second portion contact the wheel frame to prevent further axial movement of the torque tube with respect to the wheel frame.

In an embodiment, the method may also include the step of, prior to lowering the torque tube, positioning the wheel frame in a fixture.

In an embodiment, the method may also include the step of establishing a labyrinth sealing arrangement between the toque tube and seal ring after the torque tube is lowered onto the wheel frame.

In an embodiment, the method may also include the steps of coupling the torque tube to the wheel frame, decoupling the first clamp portion from the second clamp portion, and removing the first clamp portion and the second clamp portion from the torque tube.

In an embodiment, the first clamp portion and the second clamp portion are generally semi-circular in shape and each have a pair of opposed distal ends.

In an embodiment, the first clamp portion may include opposed first clamp blocks coupled to an outer peripheral surface of the first clamp portion adjacent to the distal ends of the first clamp portion and the second clamp portion may include opposed second clamp blocks coupled to an outer peripheral surface of the second clamp portion adjacent to the distal ends of the second clamp portion. In an embodiment, the first clamp portion and the second clamp portion are clamped together via the first and second clamp blocks.

In an embodiment, the method may also include the step of, prior to lowering the torque tube, lifting the torque tube via the first clamp portion and the second clamp portion into a position above the wheel frame and generally vertically aligned with the wheel frame.

In yet another embodiment, a system is provided. The system includes a torque tube having a ring gear and a barrel portion extending from the ring gear and defining a shoulder portion therebetween, a wheel frame having a seal ring coupled to the torque tube and providing a seal between the seal ring and the torque tube, and a spacing device coupled to the torque tube at a predetermined axial location along the torque tube. The spacing device includes a plurality of depending legs that are configured to contact the wheel frame to set a predetermined clearance between the torque tube and the seal ring.

In an embodiment, the spacing device includes a first clamp portion that is arcuate in shape and has opposed first distal ends and a second clamp portion that is arcuate in shape and has opposed second distal ends. In an embodiment, the second distal ends of the second clamp portion are arranged so as to abut the first distal ends of the first clamp portion to form a ring within which the torque tube is clamped.

In an embodiment, the first and second clamp portions include a plurality of clamp blocks and clamping members configured to selectively decrease a diameter of the ring to exert a clamping force on an outer peripheral surface of the torque tube adjacent to the shoulder.

In an embodiment, the first and second clamp portions each include a lifting aperture for lifting the spacing device and the torque tube.

In an embodiment, the first and second clamp portions each include at least one tab extending inwardly toward a center of the ring. The tabs are configured to contact the shoulder of the torque tube to retain the spacing device at the predetermined axial location.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of skill in the art upon reviewing the above description. The terms "including" and "in which" are used as the plain-English equivalents of the respective terms "comprising" and "wherein." Moreover, the terms "first," "second," "third," "upper," "lower," "bottom," "top," etc. are used merely as labels, and are not intended to impose numerical or positional requirements on their objects.

This written description uses examples to disclose several embodiments of the invention, including the best mode, and also to enable one of ordinary skill in the art to practice the embodiments of invention, including making and using any devices or systems and performing any incorporated methods.

As used herein, an element or step recited in the singular and proceeded with the word "a" or "an" should be understood as not excluding plural of the elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the embodiments described herein without departing from the spirit and scope of the invention herein involved, it is intended that all of the subject matter of the above description or shown in the accompanying drawings shall be interpreted merely as examples illustrating the inventive concept herein and shall not be construed as limiting the invention.

What is claimed is:

1. An apparatus for installing a torque tube, comprising:
a first clamp portion, the first clamp portion being arcuate in shape and having opposed first distal ends;
a second clamp portion, the second clamp portion being arcuate in shape and having opposed second distal ends configured to abut the first distal ends of the first clamp portion to form a ring, the first clamp portion and the second clamp portion being configured to clamp a torque tube therebetween;
a plurality of legs depending downwardly from the first clamp portion and the second clamp portion and configured to set a spacing between the torque tube and a seal ring; and
at least one rib extending generally perpendicular from each of the first clamp portion and the second clamp portion, the at least one rib including a lifting aperture permitting the apparatus and the torque tube clamped therein to be lifted.

2. The apparatus of claim 1, further comprising:
plural tabs at least one or more of which are coupled to the first clamp portion and at least one or more others of which are coupled to the second clamp portion, the tabs extending inwardly toward a center of the ring and being configured to contact a shoulder of the torque tube to align the apparatus at a predetermined axial location on the torque tube.

3. The apparatus of claim 2, wherein:
respective underside surfaces of the tabs are substantially planar with a top surface of the first and second clamp portions when formed as the ring; and
wherein the underside surfaces of the tabs are configured to rest upon the shoulder of the torque tube.

4. The apparatus of claim 2, wherein:
the legs are configured to contact a flange of a wheel frame containing the seal ring to arrest axial movement of the torque tube with respect to the wheel frame to set the spacing between the torque tube and the seal ring.

5. The apparatus of claim 4, wherein:
the legs are substantially L-shaped.

6. The apparatus of claim 4, further comprising:
opposed first clamp blocks coupled to an outer peripheral surface of the first clamp portion adjacent to the first distal ends, respectively;
opposed second clamp blocks coupled to an outer peripheral surface of the second clamp portion adjacent to the second distal ends, respectively, the first and second clamp blocks forming opposed clamp block pairs; and
a fastening means associated with each clamp block pair for urging the opposed first distal ends of the first clamp portion and the opposed second distal ends of the second clamp portion towards one another to decrease a diameter of the ring.

7. The apparatus of claim 6, wherein:
the first clamp blocks and the second clamp blocks each have a generally U-shaped channel formed therein such that each opposed clamp block pair has a channel extending throughout a length thereof; and
wherein the fastening means comprises a bolt disposed in the channel and a nut threadedly engaged with the bolt.

8. The apparatus of claim 6, wherein:
the first clamp portion and the second clamp portion are configured to exert a clamping force on a peripheral surface of a ring gear of the torque tube sufficient to bear the weight of the torque tube.

9. The apparatus of claim 8, wherein:
the shoulder is located intermediate the ring gear and a barrel portion of the torque tube.

10. A system, comprising:
a torque tube having a ring gear and a barrel portion extending from the ring gear and defining a shoulder portion therebetween;
a wheel frame having a seal ring coupled to the torque tube and providing a seal between the seal ring and the torque tube; and
a spacing device coupled to the torque tube at a predetermined axial location along the torque tube, the spacing device including a plurality of depending legs that are configured to contact the wheel frame to set a predetermined clearance between the torque tube and the seal ring.

11. The system of claim 10, wherein:
the spacing device includes a first clamp portion that is arcuate in shape and has opposed first distal ends and a second clamp portion that is arcuate in shape and has opposed second distal ends;
wherein the second distal ends of the second clamp portion are arranged so as to abut the first distal ends of the first clamp portion to form a ring within which the torque tube is clamped.

12. The system of claim 11, wherein:
the first and second clamp portions include a plurality of clamp blocks and clamping members configured to selectively decrease a diameter of the ring to exert a clamping force on an outer peripheral surface of the torque tube adjacent to the shoulder.

13. The system of claim 12, wherein:
the first and second clamp portions each include a lifting aperture for lifting the spacing device and the torque tube.

14. The system of claim 13, wherein:
the first and second clamp portions each include at least one tab extending inwardly toward a center of the ring, the tabs being configured to contact the shoulder of the torque tube to retain the spacing device at the predetermined axial location.

15. An apparatus for installing a torque tube, comprising:
a first clamp portion, the first clamp portion being arcuate in shape and having opposed first distal ends;
a second clamp portion, the second clamp portion being arcuate in shape and having opposed second distal ends configured to abut the first distal ends of the first clamp portion to form a ring, the first clamp portion and the second clamp portion being configured to clamp a torque tube therebetween;
a plurality of legs depending downwardly from the first clamp portion and the second clamp portion and configured to set a spacing between the torque tube and a seal ring, wherein the legs are configured to contact a flange of a wheel frame containing the seal ring to arrest axial movement of the torque tube with respect to the wheel frame to set the spacing between the torque tube and the seal ring;

plural tabs at least one or more of which are coupled to the first clamp portion and at least one or more others of which are coupled to the second clamp portion, the tabs extending inwardly toward a center of the ring and being configured to contact a shoulder of the torque tube to align the apparatus at a predetermined axial location on the torque tube;

opposed first clamp blocks coupled to an outer peripheral surface of the first clamp portion adjacent to the first distal ends, respectively;

opposed second clamp blocks coupled to an outer peripheral surface of the second clamp portion adjacent to the second distal ends, respectively, the first and second clamp blocks forming opposed clamp block pairs;

a fastening means associated with each clamp block pair for urging the opposed first distal ends of the first clamp portion and the opposed second distal ends of the second clamp portion towards one another to decrease a diameter of the ring; and at least one rib extending generally perpendicular from each of the first clamp portion and the second clamp portion, the at least one rib including a lifting aperture permitting the apparatus and the torque tube clamped therein to be lifted.

16. The apparatus of claim 15, wherein:
respective underside surfaces of the tabs are substantially planar with a top surface of the first and second clamp portions when formed as the ring; and
wherein the underside surfaces of the tabs are configured to rest upon the shoulder of the torque tube.

17. The apparatus of claim 15, wherein the legs are substantially L-shaped.

18. The apparatus of claim 15, wherein:
the first clamp blocks and the second clamp blocks each have a generally U-shaped channel formed therein such that each opposed clamp block pair has a channel extending throughout a length thereof; and
wherein the fastening means comprises a bolt disposed in the channel and a nut threadedly engaged with the bolt.

19. The apparatus of claim 15, wherein the first clamp portion and the second clamp portion are configured to exert a clamping force on a peripheral surface of a ring gear of the torque tube sufficient to bear the weight of the torque tube.

20. The apparatus of claim 15, wherein the shoulder is located intermediate the ring gear and a barrel portion of the torque tube.

* * * * *